(No Model.)
L. WATKINS.
BICYCLE GEARING.
No. 516,287. Patented Mar. 13, 1894.
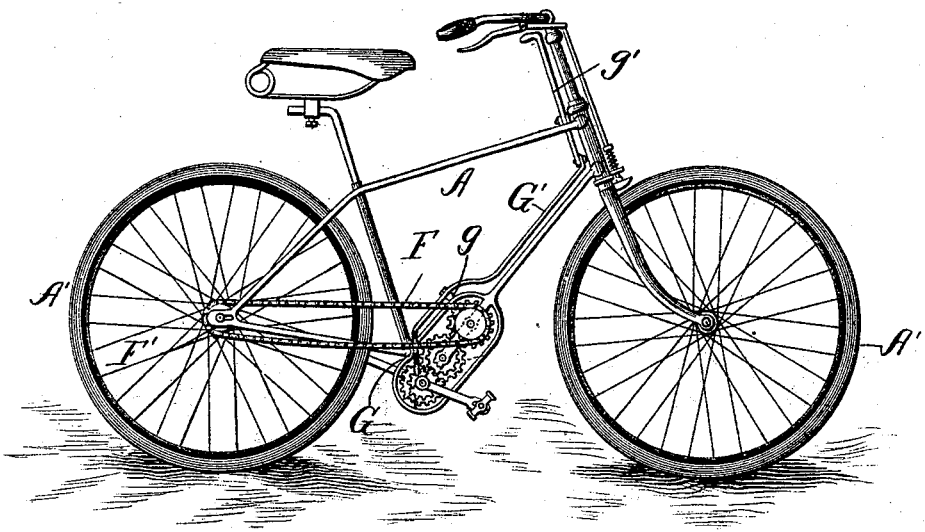
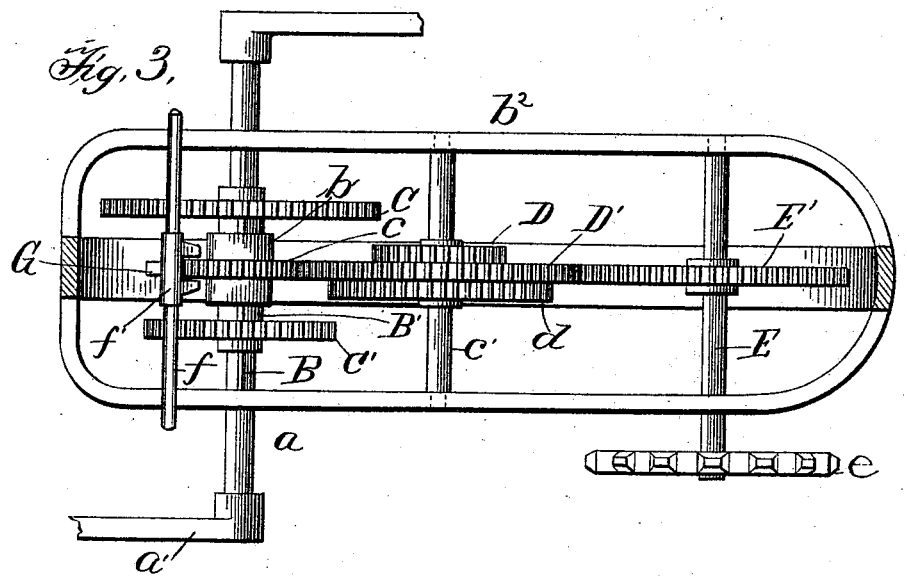
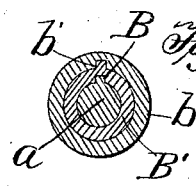
Witnesses:
Inventor.
Lee Watkins
By Dwight & Boiz
Attys

UNITED STATES PATENT OFFICE.

LEE WATKINS, OF COLORADO CITY, COLORADO.

BICYCLE-GEARING.

SPECIFICATION forming part of Letters Patent No. 516,287, dated March 13, 1894.

Application filed August 19, 1893. Serial No. 483,526. (No model.)

*To all whom it may concern:*

Be it known that I, LEE WATKINS, a citizen of the United States, residing at Colorado City, in the county of El Paso and State of Colorado, have invented certain new and useful Improvements in Bicycle-Gearing; and I do declare the following to be a full, clear, and exact description of the invention, such as will enable others skilled in the art to which it appertains to make and use the same, reference being had to the accompanying drawings, and to the letters of reference marked thereon, which form a part of this specification.
My invention relates to an improvement in that class of bicycle gearing in which means are provided for varying the speed at which the machine is operated and my invention consists in certain improvements in the usual shiftable gears whereby the speed may be changed in a more efficient and expeditious manner.

Referring to the accompanying drawings, Figure 1 represents a side elevation of an ordinary safety bicycle equipped with my improvements; Fig. 2 a cross section of the sleeves for carrying the gearing; Fig. 3 a longitudinal section.

The reference letter A, indicates the frame of the bicycle and A' the wheels all of which may be of any preferred construction.

$a$, is the pedal shaft, which has as usual the pedals $a'$ firmly fixed thereon. Formed integral with or rigidly secured to the pedal shaft $a$, is a longitudinally extending key B, which is adapted to fit in a corresponding longitudinal slot or passage formed in the interior of the sleeve B'. The sleeve B', is of a length not quite equal to the distance between the side frames $b^2$, of the bicycle and it is adapted to slide independently and longitudinally in the shaft $a$, but it is only capable of revolving in unison with the shaft.

Arranged over the sleeve B' and fitting snugly though loosely thereon is a second sleeve $b$, which is about one half the length of the sleeve B' and the two sleeves, B' and $b$, are provided respectively with a key, $b'$, and slot, similar to the key and slot in the shaft $a$, the interior of sleeve B', which operates to prevent independent rotary movement of the two sleeves, but it allows them to move longitudinally independent of each other. Mounted on each end of the sleeve B' are the spur gears C and C', which are fixed to the sleeve so as to revolve therewith and the gear C, is of a size about one and a half times that of its companion C'. The sleeve $b'$, has fixed to its middle the gear $c$, which is adapted to move therewith; the two, the sleeve and gear, being incapable of independent movement and the gear is of a size about one half that of the gear C.

Mounted in the frame $b^2$, is a shaft $c'$, upon which are loosely mounted the gears D, D' and $d$. These gears are arranged side by side and are rigidly connected to each other so that when motion is imparted to one the others will move in unison with the first. The gears D, D' and $d$ are each of a different size and this size is regulated by the size of the gears C, $c$ and C' with which the gears D, D' and $d$ respectively mesh. Thus as the gear C is the largest on the pedal or driving shaft, the gear D, is made the smallest on the shaft $c'$; gear $c$, the smallest on the pedal shaft and gear D' the largest on the shaft $c'$, and gear C' the medium in the pedal shaft and gear $d$, the medium on the shaft $c'$. By shifting the gears C, $c$ and C' to various positions they will be made to engage their respective gears on the shaft $c'$, and through these means the speed and leverage at the command of the operator may be regulated.

Journaled in the forward extremity of the frame $b$, is a third shaft E, which is adapted to revolve in its bearings and has fixed thereon the gear E' which meshes continuously with the gear D' and derives its motion therefrom. This shaft has fixed to its outer right-hand end, beyond its bearing, a sprocket wheel $e$, over which the chain F operates and this chain extends back to the second sprocket wheel, F', which is fixed to the axle of the rear wheel as usual, and whereby the machine is driven.

Rigidly secured to the frame $b^2$, and extending laterally across the same on a line parallel with the shaft $a$, is a bar $f$, on which is arranged and adapted to move laterally thereon the jaw $f'$. The jaw $f'$ embraces the periphery of the gear $c$, and it is connected to the vertically extending arm G, of the rock shaft G', which shaft extends diagonally forward and upwardly to the front portion of the frame, bearings $g$ being provided whereby it is held in place. At its forward end the shaft G, is connected firmly and rigidly to the operating arm $g'$ which extends vertically to a point which will be in convenient reach to the operator, and by this means the shaft $G'$, is rocked. This operation will be followed by the rocking of the arm G, and lateral movement of the jaw $f'$, which will result in the shifting of the gears and a consequent changing in the speed of the machine and in the leverage at the command of the operator.

The gear frame $b^2$, is preferably formed integral with the remainder of the bicycle frame and it extends diagonally upward and forward in a direction parallel with that of the shaft $G'$. Such a construction as this will permit the shaft $G'$ to be formed straight and in one piece and to extend from the front of the machine entirely down to the driving mechanism; also, this construction allows the pedal shaft to be arranged far enough down to be easily operated and yet, by means of the train of gears in the frame $b^2$, the sprocket wheel $e$, is raised to the level of the axle of the wheels.

In using my invention: The normal position of the parts is that which they are shown as assuming in the drawings, and when so arranged the machine will be operated under conditions similar to those of the ordinary bicycle. Should it be desirous, however, to increase the speed of the machine at the expense of leverage, the operating arm $g'$ is moved to the left, which will as before explained, be followed by a lateral movement of the jaw $f'$, as the jaw $f'$ moves to the left it carries with it the gear $c$, thus disengaging this gear and the gear $D'$ and, for a moment, disconnecting the power communicating mechanism of the machine. When the gear $c$, is moved, the sleeve $b'$, being in rigid connection therewith, moves with it and as it continues its movement on the sleeve $B'$, its left hand end engages and carries with it the gear C. This, of course, is followed by a movement, to the left, of the sleeve $B'$ and its attached gears, C and $C'$, which continues until the gear $C'$, meshes with the gear $d$, whereupon the side of the gear $C'$, engages the side of the fixed gear $D'$ and further movement to the right is thereby rendered impossible. When the parts assume this position the power from the shaft $a$, is again transmitted to the shaft $c'$ and thence to the shaft E, and to the driving wheel of the bicycle. This adjustment will make it impossible for the operator to drive the machine faster than ordinarily and should it be desirous to increase the speed still further, at of course a further expenditure of power, the gears C and D are made to engage as has been before explained. When this has been effected the large gear C, will mesh smallest gear on shaft $c'$, and cause the said shaft to revolve with increased rapidity.

Having thus described my invention, what I claim as new, and desire to secure by Letters Patent, is—

In a propulsion gearing for bicycles the combination of a drive or pedal shaft, a sleeve arranged on the pedal shaft and capable of independent longitudinal movement thereon, and incapable of independent rotary movement, two gears one fixed to each end of the sleeve, a second sleeve arranged on the first and capable of movement thereon similar to the movements of the first sleeve, a gear on the second sleeve and adapted to normally mesh with the driving gear of the machine and means for moving the second sleeve in either longitudinal direction whereby the gear thereon may be disengaged from the driving gear and either of the gears on the first sleeve made to engage it, substantially as described.

In testimony whereof I affix my signature in presence of two witnesses.

LEE WATKINS.

Witnesses:
CHAS. L. CUNNINGHAM,
L. W. CUNNINGHAM.